United States Patent
Qu

(10) Patent No.: US 11,232,161 B1
(45) Date of Patent: Jan. 25, 2022

(54) METHODS AND APPARATUSES FOR ELECTRONICALLY STAMPING DOCUMENT

(71) Applicant: ALIPAY (HANGZHOU) INFORMATION TECHNOLOGY CO., LTD., Zhejiang (CN)

(72) Inventor: Jinyu Qu, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/355,759

(22) Filed: Jun. 23, 2021

(30) Foreign Application Priority Data

Sep. 11, 2020 (CN) .......................... 202010955058.7

(51) Int. Cl.
*G06F 16/93* (2019.01)
*G06K 9/00* (2006.01)
*H04L 9/32* (2006.01)
*G06F 16/906* (2019.01)

(52) U.S. Cl.
CPC ............ *G06F 16/93* (2019.01); *G06F 16/906* (2019.01); *G06K 9/00449* (2013.01); *H04L 9/3247* (2013.01)

(58) Field of Classification Search
CPC ... G06F 16/93; G06F 16/906; G06K 9/00449; H04L 9/3247
USPC ........................................................ 707/722
See application file for complete search history.

(56) References Cited

U.S. PATENT DOCUMENTS

| | | | |
|---|---|---|---|
| 2007/0204165 A1* | 8/2007 | Lytle ....................... | G06F 21/64 713/176 |
| 2009/0238625 A1* | 9/2009 | Ming ................... | G07D 7/0043 400/76 |
| 2011/0246932 A1* | 10/2011 | Van Roy ............... | G06F 3/0481 715/780 |

OTHER PUBLICATIONS

Wawrzyniak, Gerard, et al., "New XML Signature Scheme That is Resistant to Some Attacks", IEEE Access, vol. 8, Feb. 19, 2020, pp. 35815-35831.*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

*Primary Examiner* — Robert Stevens
(74) *Attorney, Agent, or Firm* — Fish & Richardson P.C.

(57) ABSTRACT

Disclosed herein are methods, systems, and apparatus, including computer programs encoded on computer storage media, for electronically stamping a document. One of the methods include receiving an electronic stamping instruction, where the electronic stamping instruction comprises a to-be-stamped document and a stamping type. In response to determining that a format of the to-be-stamped document is a predetermined document format and the stamping type is a first stamping type, a first to-be-stamped area of the to-be-stamped document is determined. An electronic stamp corresponding to the to-be-stamped document is identified using an encryption algorithm interface. A first electronically stamped document is generated and include the electronic stamp in the first to-be-stamped area.

20 Claims, 4 Drawing Sheets

US 11,232,161 B1

METHODS AND APPARATUSES FOR ELECTRONICALLY STAMPING DOCUMENT

CROSS-REFERENCE TO RELATED APPLICATIONS

This application claims priority to Chinese Patent Application No. 202010955058.7, filed on Sep. 11, 2020, which is hereby incorporated by reference in its entirety.

TECHNICAL FIELD

Embodiments of the present specification relate to the field of compliance data management technologies, and in particular, to methods for electronically stamping a document. One or more embodiments of the present specification also relate to apparatuses for electronically stamping a document, computing devices, and computer-readable storage media.

BACKGROUND

A financial regulatory agency is an agency supervising and managing the financial system of a country according to regulations of the law. To perform supervision and management, the financial regulatory agency requires each enterprise in the financial system to submit and review its monthly, quarterly or annual financial transaction data. To supervise the authenticity of the document content of financial transaction data provided by each enterprise, the financial regulatory agency requires the document content of financial transaction data provided by each enterprise to include the signature stamp of the enterprise. In the current situation where electronic data is popular, to reduce paper costs and improve supervision efficiency, the financial regulatory agency requires each enterprise to submit financial transaction data in the form of electronic documents.

Therefore, how to quickly and accurately embed electronic signature stamps of enterprises in electronic documents became a technical problem that currently needs to be solved urgently.

SUMMARY

In view of this, embodiments of the present specification provide methods for electronically stamping a document. One or more embodiments of the present specification also relate to apparatuses for electronically stamping a document, computing devices, and computer-readable storage media, to solve technical defects in the existing technology.

According to a first aspect of the embodiments of the present specification, a method for electronically stamping a document is provided, including the following.

An electronic stamping instruction is received, where the electronic stamping instruction includes a to-be-stamped document and a stamping method; a first to-be-stamped area of the document is determined when a format of the document is a predetermined document format and the stamping method is a first stamping method; and an electronic signature stamp corresponding to the document is invoked by using an encryption algorithm interface, and the electronic signature stamp is placed in the first to-be-stamped area to generate a first electronic signature stamp document.

Optionally, the determining a first to-be-stamped area of the document includes: segmenting the document into a plurality of text areas based on a predetermined segmentation box; recognizing texts in each text area, and counting the number of texts recognized in each text area; and using a text area with the smallest number recognized as the first to-be-stamped area of the document.

Optionally, the determining a first to-be-stamped area of the document includes: segmenting the first page of the document into a plurality of text areas based on a predetermined segmentation box; recognizing texts in each text area, and counting the number of texts recognized in each text area; using a text area with the smallest number recognized as a stamping area of the first page of the document, and using locations in other pages of the document that correspond to the stamping area of the first page as stamping areas of the other pages; and determining the stamping area of the first page and the stamping areas of the other pages as the first to-be-stamped area of the document.

Optionally, the determining a first to-be-stamped area of the document includes: recognizing texts in the document, and when the texts include a text that matches a predetermined signature stamp text, determining a location of the text that matches the predetermined signature stamp text as the first to-be-stamped area of the document.

Optionally, the recognizing texts in the document, and when the texts include a text that matches a predetermined signature stamp text, determining a location of the text that matches the predetermined signature stamp text as the first to-be-stamped area of the document includes: segmenting the document into a plurality of text areas based on a predetermined segmentation box; and recognizing texts in each text area, and when the texts include a text that matches the predetermined signature stamp text, using a text area in which the text that matches the predetermined signature stamp text is located as the first to-be-stamped area of the document.

Optionally, the determining a first to-be-stamped area of the document includes: receiving a box select operation of a user for the document, and determining an area selected by the box select operation as the first to-be-stamped area of the document.

Optionally, the receiving a box select operation of a user for the document, and determining an area selected by the box select operation as the first to-be-stamped area of the document includes: receiving a box select operation of the user for the first page of the document, and determining an area selected by the box select operation as a stamping area of the first page of the document; determining locations in other pages of the document that correspond to the stamping area of the first page as stamping areas of the other pages; and determining the stamping area of the first page and the stamping areas of the other pages as the first to-be-stamped area of the document.

Optionally, after the receiving an electronic stamping instruction, the method further includes the following.

A second to-be-stamped area of the document is determined when the format of the document is the predetermined document format and the stamping method is a second stamping method.

Optionally, the determining a second to-be-stamped area of the document includes: horizontally splicing a current page of the document and a next page of the document, and using a splicing area as the second to-be-stamped area of the document.

Optionally, the determining a second to-be-stamped area of the document includes: invoking the electronic signature stamp corresponding to the document by using the encryption algorithm interface, and dividing the electronic signature stamp into a first electronic signature stamp and a second electronic signature stamp by half; using an edge area, in a current page of the document, with the same width as the first electronic signature stamp as a first edge stamping area; using an edge area, in a next page of the document, with the same width as the second electronic signature stamp as a second edge stamping area, where a location of the first edge stamping area corresponds to that of the second edge stamping area; and determining the first edge stamping area and the second edge stamping area as the second to-be-stamped area of the document.

Optionally, after the determining a second to-be-stamped area of the document, the method further includes the following.

The first electronic signature stamp is placed in the first edge stamping area, and the second electronic signature stamp is placed in the second edge stamping area to generate a second electronic signature stamp document.

Optionally, the determining a second to-be-stamped area of the document includes: invoking the electronic signature stamp corresponding to the document by using the encryption algorithm interface; evenly dividing the electronic signature stamp based on the number of pages of the document when the number of pages of the document is less than a predetermined threshold; and determining the second to-be-stamped area of the document based on electronic signature stamps obtained after division.

According to a second aspect of the embodiments of the present specification, an apparatus for electronically stamping a document is provided, including: a first receiving module, configured to receive an electronic stamping instruction, where the electronic stamping instruction includes a to-be-stamped document and a stamping method; a first determining module, configured to determine a first to-be-stamped area of the document when a format of the document is a predetermined document format and the stamping method is a first stamping method; and a first stamping module, configured to invoke an electronic signature stamp corresponding to the document by using an encryption algorithm interface, and place the electronic stamp in the first to-be-stamped area to generate a first electronic signature stamp document.

Optionally, the first determining module is further configured to segment the document into a plurality of text areas based on a predetermined segmentation box; recognize texts in each text area, and count the number of texts recognized in each text area; and use a text area with the smallest number recognized as the first to-be-stamped area of the document.

Optionally, the first determining module is further configured to segment the first page of the document into a plurality of text areas based on a predetermined segmentation box; recognize texts in each text area, and count the number of texts recognized in each text area; use a text area with the smallest number recognized as a stamping area of the first page of the document, and use locations in other pages of the document that correspond to the stamping area of the first page as stamping areas of the other pages; and determine the stamping area of the first page and the stamping areas of the other pages as the first to-be-stamped area of the document.

Optionally, the first determining module is further configured to recognize texts in the document, and when the texts include a text that matches a predetermined signature stamp text, determine a location of the text that matches the predetermined signature stamp text as the first to-be-stamped area of the document.

Optionally, the first determining module is further configured to segment the document into a plurality of text areas based on a predetermined segmentation box; and recognize texts in each text area, and when the texts include a text that matches the predetermined signature stamp text, use a text area in which the text that matches the predetermined signature stamp text is located as the first to-be-stamped area of the document.

Optionally, the first determining module is further configured to receive a box select operation of a user for the document, and determine an area selected by the box select operation as the first to-be-stamped area of the document.

Optionally, the first determining module is further configured to receive a box select operation of the user for the first page of the document, and determine an area selected by the box select operation as a stamping area of the first page of the document; determine locations in other pages of the document that correspond to the stamping area of the first page as stamping areas of the other pages; and determine the stamping area of the first page and the stamping areas of the other pages as the first to-be-stamped area of the document.

Optionally, the apparatus further includes: a second determining module, configured to determine a second to-be-stamped area of the document when the format of the document is the predetermined document format and the stamping method is a second stamping method.

Optionally, the second determining module is further configured to horizontally splice a current page of the document and a next page of the document, and use a splicing area as the second to-be-stamped area of the document.

Optionally, the second determining module is further configured to invoke the electronic signature stamp corresponding to the document by using the encryption algorithm interface, and divide the electronic signature stamp into a first electronic signature stamp and a second electronic signature stamp by half; use an edge area, in a current page of the document, with the same width as the first electronic signature stamp as a first edge stamping area; use an edge area, in a next page of the document, with the same width as the second electronic signature stamp as a second edge stamping area, where a location of the first edge stamping area corresponds to that of the second edge stamping area; and determine the first edge stamping area and the second edge stamping area as the second to-be-stamped area of the document.

Optionally, the apparatus further includes: a second stamping module, configured to place the first electronic signature stamp in the first edge stamping area, and place the second electronic signature stamp in the second edge stamping area to generate a second electronic signature stamp document.

Optionally, the second determining module is further configured to invoke the electronic signature stamp corresponding to the document by using the encryption algorithm interface; evenly divide the electronic signature stamp based on the number of pages of the document when the number of pages of the document is less than a predetermined threshold; and determine the second to-be-stamped area of the document based on electronic signature stamps obtained after division.

According to a third aspect of the embodiments of the present specification, a computing device is provided, including: a memory and a processor, where the memory is configured to store computer executable instructions, and the processor is configured to execute the computer executable instructions: receiving an electronic stamping instruction, where the electronic stamping instruction includes a to-be-stamped document and a stamping method; determining a first to-be-stamped area of the document when a format of the document is a predetermined document format and the stamping method is a first stamping method; and invoking an electronic signature stamp corresponding to the document by using an encryption algorithm interface, and placing the electronic signature stamp in the first to-be-stamped area to generate a first electronic signature stamp document.

According to a fourth aspect of the embodiments of the present specification, a computer-readable storage medium is provided, where the computer-readable storage medium stores computer instructions, and when the instructions are executed by a processor, the steps in the method for electronically stamping a document are implemented.

One or more embodiments of the present specification provide methods and apparatuses for electronically stamping a document. In the methods for electronically stamping a document, when an electronic stamping instruction is received, different to-be-stamped areas are selected from the document based on a stamping method included in the electronic stamping instruction. Then, an electronic signature stamp corresponding to the document is invoked by using an encryption algorithm interface so as to ensure the security of the electronic signature stamp. Finally, the electronic signature stamp is placed in different to-be-stamped areas to generate different electronic signature stamp documents. As such, the document can be electronically stamped quickly, accurately, and in a personalized way, so that user experience is improved.

DESCRIPTION OF IMPLEMENTATIONS

Many details are described in the following description to facilitate full understanding of the present specification. However, the present specification can be implemented in many methods different from those described here. A person skilled in the art can perform similar promotion without violating the connotation of the present specification. Therefore, the present specification is not limited to the specific implementation disclosed below.

The term used in one or more embodiments of the present specification is merely for the purpose of describing a particular embodiment and is not intended to limit the one or more embodiments of the present specification. The terms "a" and "the" of singular forms used in one or more embodiments of the present specification and the appended claims are also intended to include plural forms, unless otherwise specified in the context clearly. It should be further understood that the term "and/or" used in one or more embodiments of the present specification indicates and includes any or all possible combinations of one or more associated listed items.

It should be understood that although terms "first," "second," etc. may be used in one or more embodiments of the present specification to describe various types of information, the information is not limited to the terms. These terms are only used to differentiate between information of the same type. For example, without departing from the scope of one or more embodiments of the present specification, first can be referred to as second, and similarly, second can be referred to as first. Depending on the context, for example, the word "if" used here can be explained as "while," "when," or "in response to determining."

A term in one or more embodiments of the present disclosure is first explained.

Paging seal: Stamp stamped on the perforation on the sides, for example, stamp evenly stamped on the perforation of two sheets of foldable paper. The stamp can be an integral one when two halves are opposite to each other.

The present specification provides methods for electronically stamping a document. One or more embodiments of the present specification also relate to apparatuses for electronically stamping a document, computing devices, and computer-readable storage media, which will be respectively described in detail in the following embodiments.

Figure 1:
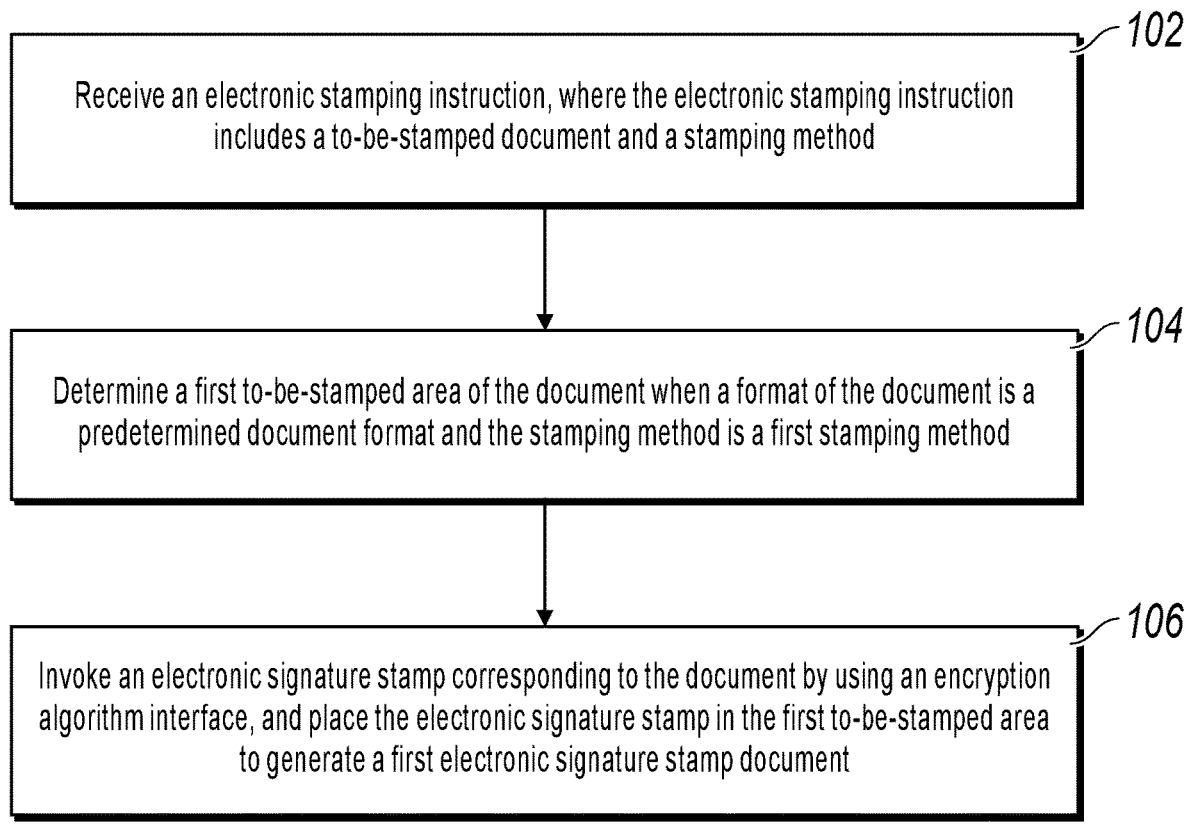
FIG. 1 is a flowchart illustrating an example of a method for electronically stamping a document, according to one or more embodiments of the present specification.

Referring to FIG. 1, FIG. 1 is a flowchart illustrating an example of a method for electronically stamping a document, according to one or more embodiments of the present specification. The method specifically includes the following steps.

Step 102: Receive an electronic stamping instruction, where the electronic stamping instruction includes a to-be-stamped document and a stamping method.

The to-be-stamped document includes but is not limited to a text document, an excel document, etc., for example, a document in a WORD format, a document in an EXCEL format, and a document in a PPT format.

The stamping method includes a first stamping method and a second stamping method. In actual applications, the first stamping method can be understood as a stamping method of stamping a complete stamp and a stamping method of stamping a paging seal.

During specific implementation, the electronic stamping instruction is first received, where the electronic stamping instruction includes the to-be-stamped document and a specific stamping method for the to-be-stamped document.

Step 104: Determine a first to-be-stamped area of the document when a format of the document is a predetermined document format and the stamping method is a first stamping method.

The first stamping method is a stamping method of stamping a complete stamp, that is, stamping a complete stamp in the to-be-stamped document.

Figure 2:
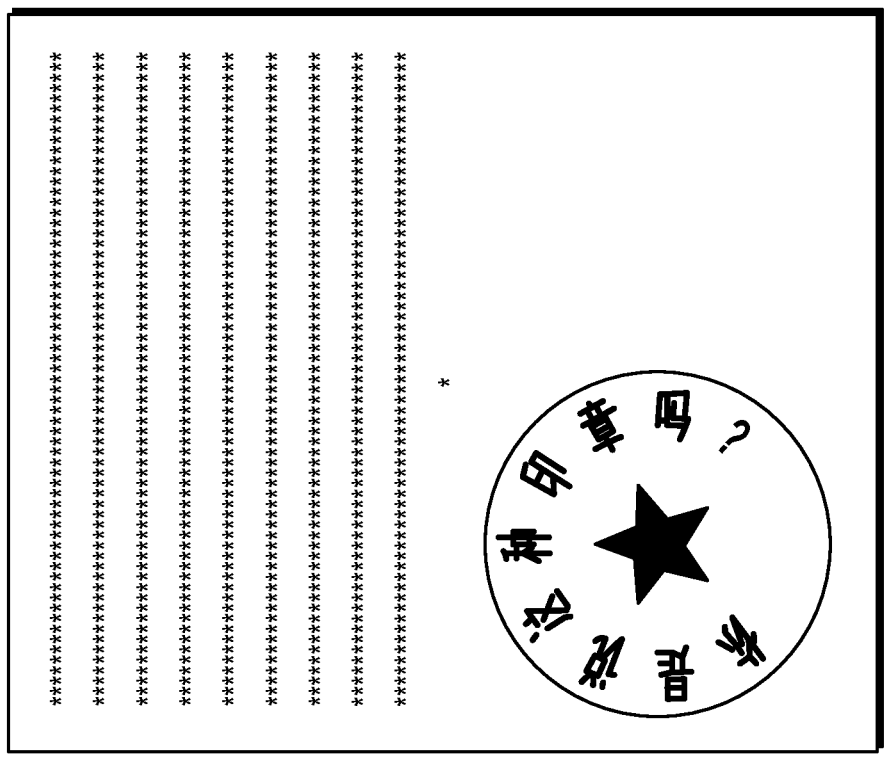
FIG. 2 is a schematic diagram illustrating an example of an electronic signature stamp document generated in a first stamping method in a method for electronically stamping a document, according to one or more embodiments of the present specification.

Referring to FIG. 2, FIG. 2 is a schematic diagram illustrating an example of an electronic signature stamp document generated in a first stamping method in a method for electronically stamping a document, according to one or more embodiments of the present specification.

In FIG. 2, the signature stamp in the lower left corner of the document is an electronic signature stamp of the document implemented in the first stamping method.

Specifically, after the electronic stamping instruction is received, the to-be-stamped document included in the electronic stamping instruction is obtained to determine the format of the document, for example, determine that the document is a document in a WORD format, an EXCEL format, a PPT format, or a PDF format.

The to-be-stamped area of the document is determined when it is determined that the format of the document is the predetermined document format. For example, if the predetermined document format is the PDF format, the to-be-stamped area of the document is determined only when the format of the document is the PDF format, and the format of the document needs to be converted based on document format conversion software to convert the document into the predetermined document format when the format of the document is not the predetermined document format.

During specific implementation, because a document in the PDF format has a function of supporting digital signature, To avoid a need to install a corresponding plug-in that can implement digital signature when documents of other formats need to be digitally signed, and to improve electronic stamping efficiency, all documents of other formats will be converted to PDF format when being digitally signed. For example, the predetermined document format is the PDF format. After the electronic stamping instruction is received, the format of the to-be-stamped document needs to be converted into the PDF format if the format of the to-be-stamped document included in the electronic stamping instruction is the WORD format.

In actual applications, the to-be-stamped area of the document is determined when it is determined that the format of the to-be-stamped area is the predetermined format and the stamping method is the first stamping method. The to-be-stamped area of the document is determined in different methods based on different application scenarios.

In other optional embodiments of the present specification, the determining a first to-be-stamped area of the document when a format of the document is a predetermined document format and the stamping method is a first stamping method includes: segmenting the document into a plurality of text areas based on a predetermined segmentation box; recognizing texts in each text area, and counting the number of texts recognized in each text area; and using a text area with the smallest number recognized as the first to-be-stamped area of the document.

Dimensions of the predetermined segmentation box can be set based on actual needs, and are not limited here. For example, a segmentation box of 21 mm*21 mm is set. Then, the document is segmented based on the segmentation box of 21 mm*21 mm so that the document is segmented into the plurality of text areas.

After the document is segmented into the plurality of text areas, the texts in each text area are recognized, then, the number of texts recognized in each text area, for example, the number of texts, letters, or numerals, is counted, and finally, the text area with the smallest number of texts recognized is used as the first to-be-stamped area of the document.

During specific implementation, if the document has one page, the first to-be-stamped area of the document is directly selected based on the previous method; or if the document has a plurality of pages, one to-be-stamped area can be selected for each page of the document based on the previous method.

In the embodiments of the present specification, the document is segmented into the plurality of text areas based on the predetermined segmentation box, and the texts in each text area are recognized, so that the recognition efficiency and the recognition accuracy of texts in the document can be greatly improved. Then, the number of texts recognized in each text area is counted, and the text area with the smallest number recognized is used as the first to-be-stamped area of the document, so that an electronic signature stamp can be placed in an area where there is a relatively small number of texts in the document, thereby preventing the electronic signature stamp from blocking the document.

In actual applications, if the document has a plurality of pages, and each page needs to be electronically stamped, a first to-be-stamped area of each page of the document needs to be determined. If the method for determining the first to-be-stamped area in the previous embodiments is used, the electronic signature stamp can be prevented from blocking texts, but segmentation, recognition, and positioning of the first to-be-stamped area is needed for each page of the document, which increases the difficulty in recognizing the first to-be-stamped area to a certain extent. In this case, if the document has a relatively large number of pages, using the previous method for determining the first to-be-stamped area greatly decreases the speed of determining the first to-be-stamped area.

Therefore, when the document has a relatively large number of pages, and each page needs to be electronically stamped, the following embodiments can be used to quickly determine the first to-be-stamped area of the document with a plurality of pages, which is specifically implemented as follows.

The determining a first to-be-stamped area of the document includes: segmenting the first page of the document into a plurality of text areas based on a predetermined segmentation box; recognizing texts in each text area, and counting the number of texts recognized in each text area; using a text area with the smallest number recognized as a stamping area of the first page of the document, and using locations in other pages of the document that correspond to the stamping area of the first page as stamping areas of the other pages; and determining the stamping area of the first page and the stamping areas of the other pages as the first to-be-stamped area of the document.

Dimensions of the predetermined segmentation box can be set based on actual applications, and are not limited here. For example, the same dimensions as the predetermined segmentation box in the previous embodiments can be set.

In the embodiments of the present specification, first, the first page of the document is segmented into the plurality of text areas based on the predetermined segmentation box, the texts in each text area are recognized, and the number of texts in each text area is counted. Then, the text area with the smallest number recognized is used as the stamping area of the first page of the document, and the locations in the other pages other than the first page in the document that correspond to the stamping area of the first page of the document are used as the stamping areas of the other pages. Finally, the stamping area of the first page of the document and the stamping areas of the other pages are used as the first to-be-stamped area of the document. As such, once the stamping area of the first page of the document is determined, the stamping areas of the other pages of the document can be quickly determined based on the stamping area of the first page of the document so as to avoid a need to recognize a to-be-stamped area of each page of the document, thereby greatly improving the speed of determining the first to-be-stamped area of the document.

In other optional embodiments of the present specification, the determining a first to-be-stamped area of the document when a format of the document is a predetermined document format and the stamping method is a first stamping method includes: recognizing texts in the document, and when the texts include a text that matches a predetermined signature stamp text, determining a location of the text that matches the predetermined signature stamp text as the first to-be-stamped area of the document.

During specific implementation, to improve the text recognition efficiency of the document, references can be made to the previous embodiments. The document is segmented into a plurality of text areas based on a predetermined segmentation box, then, texts in each text area are recognized, and finally, text recognition results in all the text areas are integrated to perform text recognition on the complete document.

The predetermined signature stamp text can be set based on actual needs. For example, "stamp" or "sign" is used as the predetermined signature stamp text.

For example, if the predetermined signature stamp text is "stamp," after the texts in the document are recognized, if the texts include the word "stamp," it can be determined that the texts include a text that matches the predetermined signature stamp text. In this case, a location where the text "stamp" that matches the predetermined signature stamp text "stamp" is located can be determined as the first to-be-stamped area of the document.

Generally, a document to be electronically stamped has a stamping indication character subsequently, so as to instruct a user to stamp the document at a correct and proper location. Therefore, based on this rule, when a document is electronically stamped, texts in the document can be recognized, and a location of a text corresponding to a predetermined signature stamping document can be used as a first to-be-stamped area of the document, which can also quickly and accurately recognize the first to-be-stamped area of the document.

To more quickly recognize the first to-be-stamped area of the document based on a matching relationship between the texts in the document and the predetermined signature stamp text, the following method can be used to determine the first to-be-stamped area of the document.

The recognizing texts in the document, and when the texts include a text that matches a predetermined signature stamp text, determining a location of the text that matches the predetermined signature stamp text as the first to-be-stamped area of the document includes: segmenting the document into a plurality of text areas based on a predetermined segmentation box; recognizing texts in each text area, and when the texts include a text that matches the predetermined signature stamp text, using a text area in which the text that matches the predetermined signature stamp text is located as the first to-be-stamped area of the document.

For detailed explanation of the predetermined segmentation box, references can be made to the previous embodiments.

In the embodiments of the present specification, first, the document is segmented into the plurality of text areas based on the predetermined segmentation box, and the texts in each text area are recognized. Each time one text in a text area is recognized, the text is matched with the predetermined signature stamp text. If the text matches the predetermined signature stamp text, the text area in which the text that matches the predetermined signature stamp text is located is directly used as the first to-be-stamped area of the document. If the text does not match the predetermined signature stamp text, texts in a next text area continue to be recognized, and the previous matching step is repeated, until a text recognized matches the predetermined signature stamp text. As such, if a text in the first text area of the document can match the predetermined signature stamp text, texts in other text areas of the document do not need to be recognized, which greatly reduces recognition processes and improves the speed of recognizing the first to-be-stamped area of the document.

In other optional embodiments of the present specification, the determining a first to-be-stamped area of the document when a format of the document is a predetermined document format and the stamping method is a first stamping method includes: receiving a box select operation of a user for the document, and determining an area selected by the box select operation as the first to-be-stamped area of the document.

In the embodiments of the present specification, to improve human-computer interaction experience and improve the user experience, the box select operation of the user for the document can be received, and then, the area selected by the box select operation of the user can be used as the first to-be-stamped area of the document.

During specific implementation, if the document has a plurality of pages, and each page of the document needs to be electronically stamped, in the previous method, the user needs to perform a box select operation on each page of the document, which greatly increases the operation burden of the user. Therefore, when the document has a plurality of pages, and each page of the document needs to be electronically stamped, the following method can be used to determine the first to-be-stamped area of the document.

The receiving a box select operation of a user for the document, and determining an area selected by the box select operation as the first to-be-stamped area of the document includes: receiving a box select operation of the user for the first page of the document, and determining an area selected by the box select operation as a stamping area of the first page of the document; determining locations in other pages of the document that correspond to the stamping area of the first page as stamping areas of the other pages; and determining the stamping area of the first page and the stamping areas of the other pages as the first to-be-stamped area of the document.

In the embodiments of the present specification, when the document has a plurality of pages, first, the box select operation of the user for the first page of the document is received, and the area selected by the box select operation is used as the stamping area of the first page of the document. Then, the locations in the other pages other than the first page in the document that correspond to the stamping area of the first page of the document are used as the stamping areas of the other pages. Finally, the stamping area of the first page and the stamping areas of the other pages are used as the first to-be-stamped area of the document. As such, once the stamping area of the first page of the document is determined, the stamping areas of the other pages of the document can be quickly determined based on the stamping area of the first page of the document, which greatly improves the efficiency of determining the first to-be-stamped area of the document.

In other embodiments of the present specification, after the receiving an electronic stamping instruction, the method further includes the following.

A second to-be-stamped area of the document is determined when the format of the document is the predetermined document format and the stamping method is a second stamping method.

The second stamping method is a stamping method of a paging seal, that is, inserting a paging seal in the to-be-stamped document.

Figure 3:
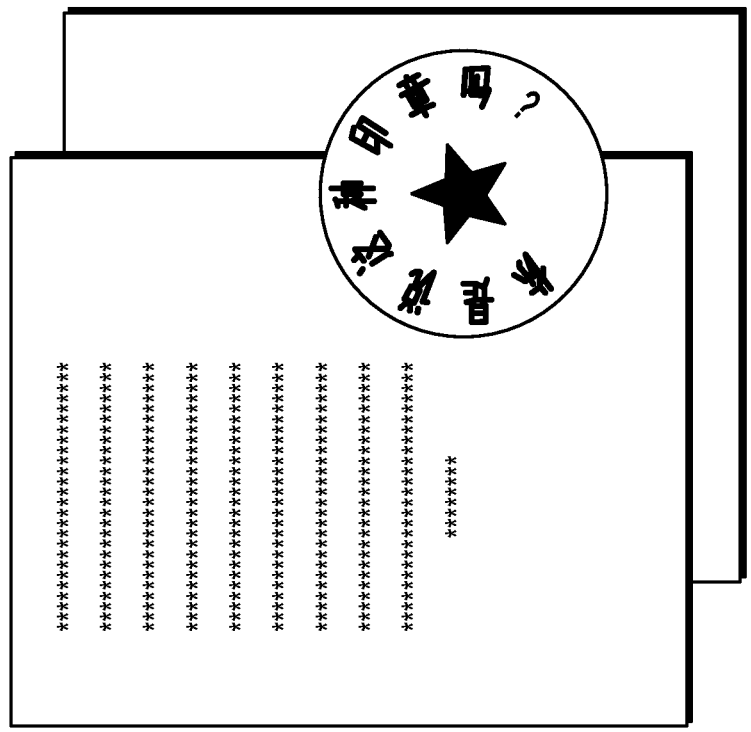
FIG. 3 is a schematic diagram illustrating an example of an electronic signature stamp document generated in a second stamping method in a method for electronically stamping a document, according to one or more embodiments of the present specification.

Referring to FIG. 3, FIG. 3 is a schematic diagram illustrating an example of an electronic signature stamp document generated in a second stamping method in a method for electronically stamping a document, according to one or more embodiments of the present specification.

In FIG. 3, the signature stamp on the right of the document is an electronic signature stamp of the document implemented in the second stamping method.

In the embodiments of the present specification, the second to-be-stamped area of the document is determined when the format of the document is the predetermined document format and the stamping method is the second stamping method. In other words, to-be-stamped areas of the document are different in different stamping methods. Determining different to-be-stamped areas based on different stamping methods can greatly improve the user's interest in electronically stamping a document by using the method for electronically stamping a document.

In other embodiments of the present specification, the determining a second to-be-stamped area of the document includes: horizontally splicing a current page of the document and a next page of the document, and using a splicing area as the second to-be-stamped area of the document.

Specifically, when the stamping method is the second stamping method, the current page and the next page in two adjacent pages of the document are horizontally spliced so that a right edge of the current page of the document and a left edge of the next page are spliced, and then, the splicing area is used as the second to-be-stamped area of the document.

In the embodiments of the present specification, when the document needs to be stamped with a paging seal, horizontally splicing the current page and the next page of the document can quickly determine a stamping area of the paging seal in the document.

In other embodiments of the present specification, the determining a second to-be-stamped area of the document includes: invoking an electronic signature stamp corresponding to the document by using an encryption algorithm interface, and dividing the electronic signature stamp into a first electronic signature stamp and a second electronic signature stamp by half using an edge area, in a current page of the document, with the same width as the first electronic signature stamp as a first edge stamping area; using an edge area, in a next page of the document, with the same width as the second electronic signature stamp as a second edge stamping area, where a location of the first edge stamping area corresponds to that of the second edge stamping area; and determining the first edge stamping area and the second edge stamping area as the second to-be-stamped area of the document.

Specifically, when the document needs to be stamped with a paging seal, a to-be-stamped area for stamping the document with a paging seal needs to be determined. First, the electronic signature stamp corresponding to the document is invoked by using the encryption algorithm interface, and the electronic signature stamp is divided into the first electronic signature stamp and the second electronic signature stamp by half. Then, the edge area, in the current page in two adjacent pages of the document, with the same width as the first electronic signature stamp is used as the first edge stamping area, and the edge area, in the next page of the document, with the same width as the second electronic signature stamp and corresponding to a location of the first edge stamping area is used as the second edge stamping area. Finally, the first edge stamping area and the second edge stamping area are used as the second to-be-stamped area. As such, the electronic stamping area for the paging seal in the document can be determined quickly and accurately based on the electronic signature stamp divided by half, so that user experience is improved.

In addition, invoking the electronic signature stamp corresponding to the document by using the encryption algorithm interface can ensure the security of the electronic signature stamp and prevent the electronic signature stamp from being intercepted or stolen in the process of being used.

Step 106: Invoke an electronic signature stamp corresponding to the document by using an encryption algorithm interface, and place the electronic signature stamp in the first to-be-stamped area to generate a first electronic signature stamp document.

Specifically, when the stamping method is the first stamping method, after the first to-be-stamped area of the document is determined, the electronic signature stamp that corresponds to the document and is invoked by using the encryption algorithm interface can be directly placed in the first to-be-stamped area to generate the electronic signature stamp document of the document.

When the stamping method is the second stamping method, after the determining a second to-be-stamped area of the document, the method further includes the following:

The first electronic signature stamp is placed in the first edge stamping area, and the second electronic signature stamp is placed in the second edge stamping area to generate a second electronic signature stamp document.

Specifically, when the stamping method is the second stamping method and the second to-be-stamped area of the document in the second stamping method is obtained, the first electronic signature stamp is placed in the first edge stamping area, and the second electronic signature stamp is placed in the second edge stamping area to generate the second electronic signature stamp document.

In the embodiments of the present specification, different to-be-stamped areas of the document can be determined based on different stamping methods. different electronic signature stamp documents can be generated by placing the electronic signature stamp in different to-be-stamped areas. In this personalized way, needs of different users for electronically stamping a document can be satisfied, so that the user experience is greatly improved.

In other feasible embodiments of the present specification, the determining a second to-be-stamped area of the document includes: invoking the electronic signature stamp corresponding to the document by using the encryption algorithm interface; evenly dividing the electronic signature stamp based on the number of pages of the document when the number of pages of the document is less than a predetermined threshold; and determining the second to-be-stamped area of the document based on electronic signature stamps obtained after division.

The predetermined threshold can be set based on actual applications. For example, the predetermined threshold is set to 20 pages or 30 pages. When there are a relatively large number of pages, each page cannot be stamped with a paging seal. Therefore, the number of pages of the document is restricted when the document is stamped with a paging seal.

In the previous embodiments, the method for determining the second to-be-stamped area of the document is pertinent to the case that the document has two pages. When the document has a plurality of pages, the electronic signature stamp can be evenly divided based on the number of pages of the document when the number of pages of the document is less than the predetermined threshold. Then, the second to-be-stamped area of the document is determined based on the electronic signature stamps obtained after division. Finally, the electronic signature stamps obtained after division are respectively placed in each second to-be-stamped area to generate the second electronic signature stamp document.

In the embodiments of the present specification, when a document with a plurality of pages is stamped with a paging seal, the paging seal can be evenly divided based on the number of pages of the document when the number of pages of the document falls within a tolerable range of the paging seal, so that each page of the document can be stamped with a part of electronic signature stamp, thereby stamping the document with the paging seal and improving user experience.

In the embodiments of the present specification, in the method for electronically stamping a document, when an electronic stamping instruction is received, different to-be-stamped areas are selected from the document based on a stamping method included in the electronic stamping instruction. Then, an electronic signature stamp corresponding to the document is invoked by using an encryption algorithm interface so as to ensure the security of the electronic signature stamp. Finally, the electronic signature stamp is placed in different to-be-stamped areas to generate different electronic signature stamp documents. As such, the document can be electronically stamped quickly, accurately, and in a personalized way, so that user experience is improved.

Figure 4:
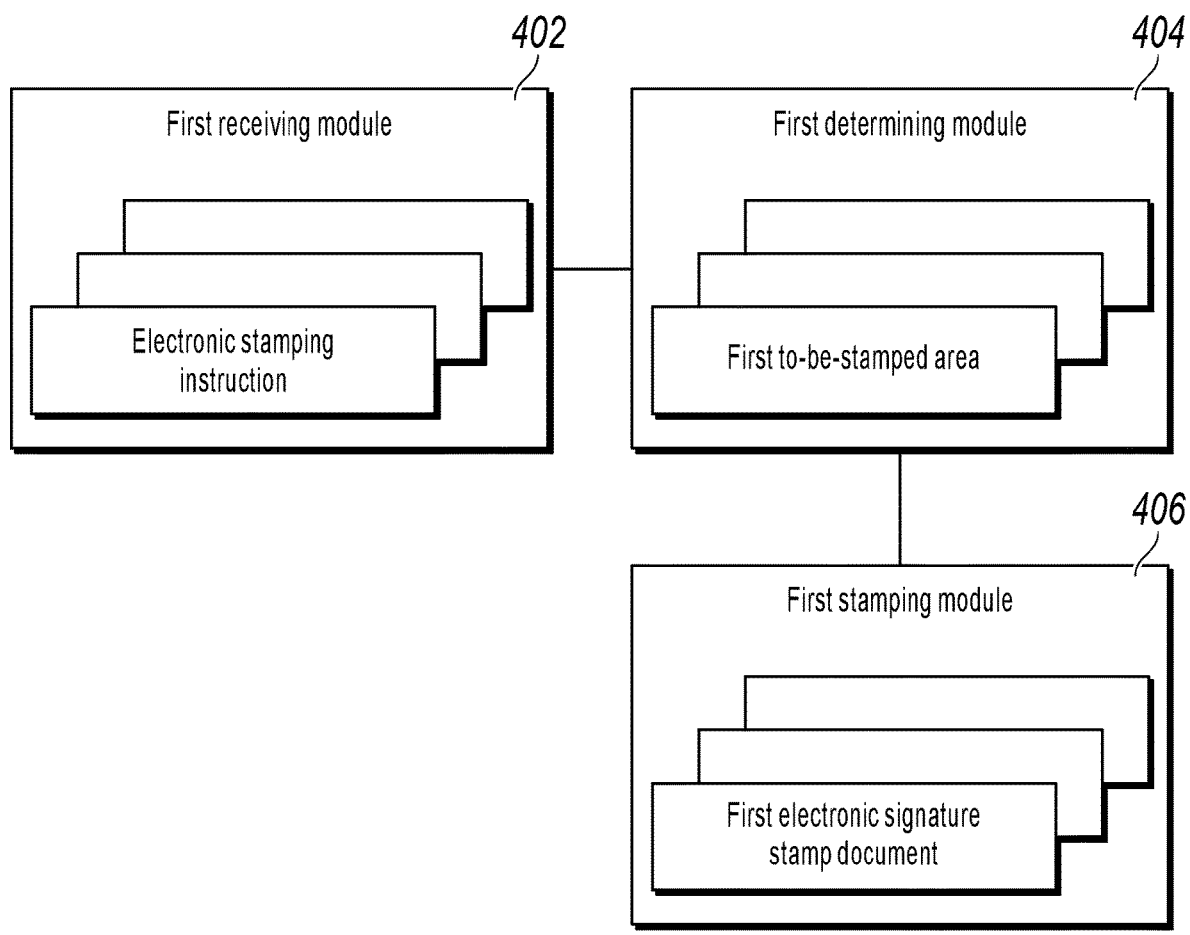
FIG. 4 is a schematic structural diagram illustrating an example of an apparatus for electronically stamping a document, according to one or more embodiments of the present specification.

Corresponding to the previous method embodiments, the present specification further provides embodiments of an apparatus for electronically stamping a document. FIG. 4 is a schematic structural diagram illustrating an example of an apparatus for electronically stamping a document, according to one or more embodiments of the present specification. As shown in FIG. 4, the apparatus includes: a first receiving module 402, configured to receive an electronic stamping instruction, where the electronic stamping instruction includes a to-be-stamped document and a stamping method; a first determining module 404, configured to determine a first to-be-stamped area of the document when a format of the document is a predetermined document format and the stamping method is a first stamping method; and a first stamping module 406, configured to invoke an electronic signature stamp corresponding to the document by using an encryption algorithm interface, and place the electronic signature stamp in the first to-be-stamped area to generate a first electronic signature stamp document.

Optionally, the first determining module 404 is further configured to: segment the document into a plurality of text areas based on a predetermined segmentation box; recognize texts in each text area, and count the number of texts recognized in each text area; and use a text area with the smallest number recognized as the first to-be-stamped area of the document.

Optionally, the first determining module 404 is further configured to: segment the first page of the document into a plurality of text areas based on a predetermined segmentation box; recognize texts in each text area, and count the number of texts recognized in each text area; use a text area with the smallest number recognized as a stamping area of the first page of the document, and use locations in other pages of the document that correspond to the stamping area of the first page as stamping areas of the other pages; and determine the stamping area of the first page and the stamping areas of the other pages as the first to-be-stamped area of the document.

Optionally, the first determining module 404 is further configured to: recognize texts in the document, and when the texts include a text that matches a predetermined signature stamp text, determine a location of the text that matches the predetermined signature stamp text as the first to-be-stamped area of the document.

Optionally, the first determining module 404 is further configured to: segment the document into a plurality of text areas based on a predetermined segmentation box; and recognize texts in each text area, and when the texts include a text that matches the predetermined signature stamp text, use a text area in which the text that matches the predetermined signature stamp text is located as the first to-be-stamped area of the document.

Optionally, the first determining module 404 is further configured to: receive a box select operation of a user for the document, and determine an area selected by the box select operation as the first to-be-stamped area of the document.

Optionally, the first determining module 404 is further configured to: receive a box select operation of the user for the first page of the document, and determine an area selected by the box select operation as a stamping area of the first page of the document; determine locations in other pages of the document that correspond to the stamping area of the first page as stamping areas of the other pages; and determine the stamping area of the first page and the stamping areas of the other pages as the first to-be-stamped area of the document.

Optionally, the apparatus further includes: a second determining module, configured to determine a second to-be-stamped area of the document when the format of the document is the predetermined document format and the stamping method is a second stamping method.

Optionally, the second determining module is further configured to: horizontally splice a current page of the document and a next page of the document, and use a splicing area as the second to-be-stamped area of the document.

Optionally, the second determining module is further configured to: invoke the electronic signature stamp corresponding to the document by using the encryption algorithm interface, and divide the electronic signature stamp into a first electronic signature stamp and a second electronic signature stamp by half; use an edge area, in a current page of the document, with the same width as the first electronic signature stamp as a first edge stamping area; use an edge area, in a next page of the document, with the same width as the second electronic signature stamp as a second edge stamping area, where a location of the first edge stamping area corresponds to that of the second edge stamping area; and determine the first edge stamping area and the second edge stamping area as the second to-be-stamped area of the document.

Optionally, the apparatus further includes: a second stamping module, configured to place the first electronic signature stamp in the first edge stamping area, and place the second electronic signature stamp in the second edge stamping area to generate a second electronic signature stamp document.

Optionally, the second determining module is further configured to: invoke the electronic signature stamp corresponding to the document by using the encryption algorithm interface; evenly divide the electronic signature stamp based on the number of pages of the document when the number of pages of the document is less than a predetermined threshold; and determine the second to-be-stamped area of the document based on electronic signature stamps obtained after division.

In the embodiments of the present specification, in the apparatus for electronically stamping a document, when an electronic stamping instruction is received, different to-be-stamped areas are selected from the document based on a stamping method included in the electronic stamping instruction. Then, an electronic signature stamp corresponding to the document is invoked by using an encryption algorithm interface so as to ensure the security of the electronic signature stamp. Finally, the electronic signature stamp is placed in different to-be-stamped areas to generate different electronic signature stamp documents. As such, the document can be electronically stamped quickly, accurately, and in a personalized way, so that user experience is improved.

The above is an example solution of an apparatus for electronically stamping a document in the embodiments. It is worthwhile to note that the technical solution of the apparatus for electronically stamping a document has the same concept as the technical solution of the previous method for electronically stamping a document. For details not described in the technical solution of the apparatus for electronically stamping a document, references can be made to descriptions of the technical solution of the previous method for electronically stamping a document.

Figure 5:
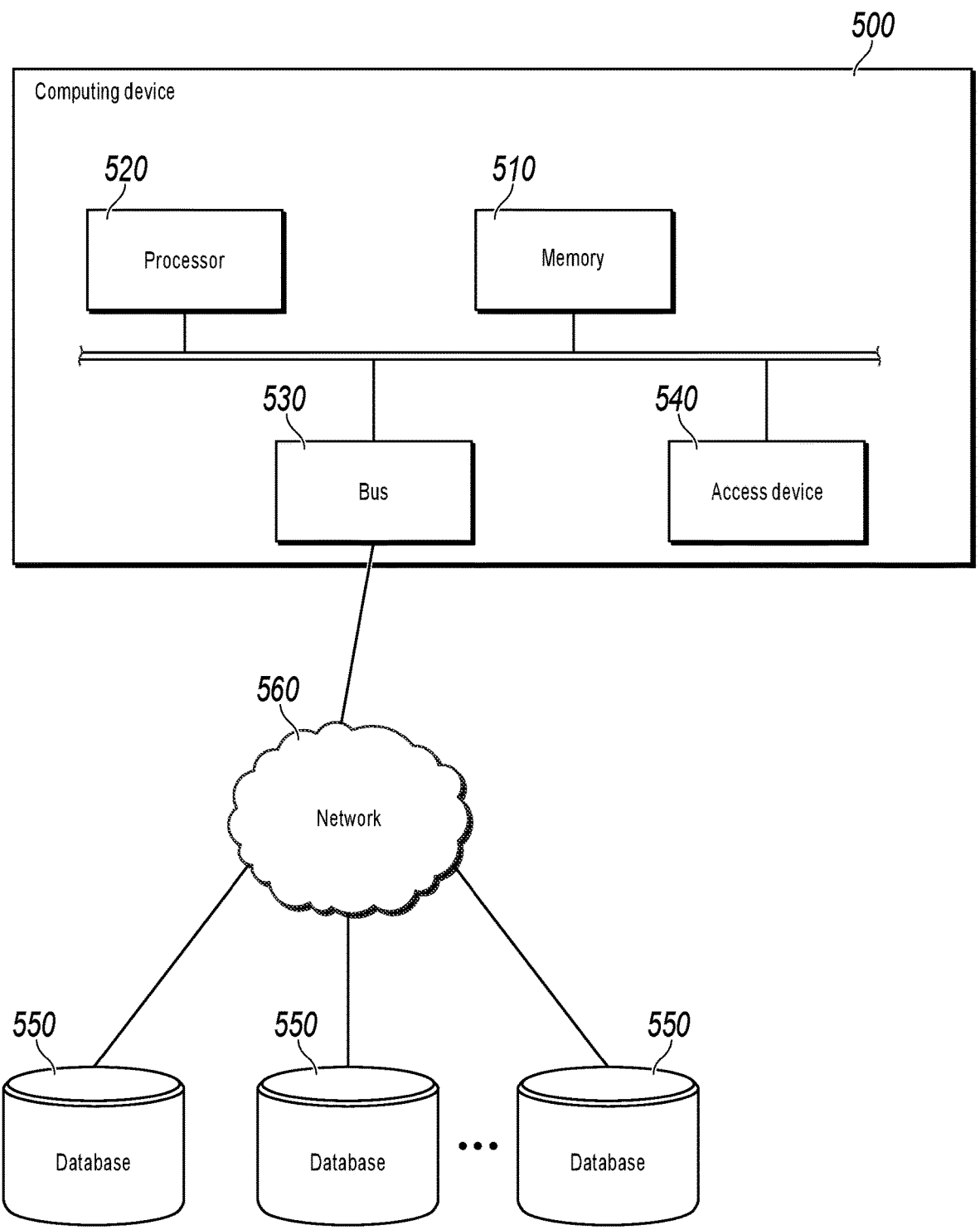
FIG. 5 is a structural block diagram illustrating an example of a computing device, according to one or more embodiments of the present specification.

Referring to FIG. 5, FIG. 5 is a structural block diagram illustrating an example of a computing device 500, according to one or more embodiments of the present specification. Components of the computing device 500 include but are not limited to a memory 510 and a processor 520. The processor 520 is connected to the memory 510 by using a bus 530, and a database 550 is configured to store data.

The computing device 500 further includes an access device 540 that enables the computing device 500 to communicate via one or more networks 560. Examples of these networks include a public switched telephone network (PSTN), a local area network (LAN), a wide area network (WAN), a personal area network (PAN), or a combination of communications networks such as the Internet. The access device 540 can include one or more wired or wireless network interfaces of any type (e.g., a network interface card (NIC)), for example, an IEEE 802.11 wireless local area network (WLAN) wireless interface, a Worldwide Interoperability for Microwave Access (WiMAX) interface, an Ethernet interface, a Universal Serial Bus (USB) interface, a cellular network interface, a Bluetooth interface, or a Near Field Communication (NFC) interface.

In one or more embodiments of the present specification, the previous components of the computing device 500 and other components not shown in FIG. 5 can also be connected to each other, for example, through the bus. It should be understood that the structural block diagram of the computing device shown in FIG. 5 is merely used as an example, and does not impose a limitation on the scope of the present specification. A person skilled in the art can add or replace a component as needed.

The computing device 500 can be any type of immobile or mobile computing device, including a mobile computer or a mobile computing device (e.g., a tablet, a personal digital assistant, a laptop, a notebook, or a netbook), a mobile phone (e.g., a smartphone), a wearable computing device (e.g., a smart watch or smart glasses), another type of mobile device, or an immobile computing device such as a desktop computer or a personal computer (PC). Alternatively, the computing device 500 can be a mobile or immobile server.

The processor 520 is configured to execute the following computer executable instructions: receiving an electronic stamping instruction, where the electronic stamping instruction includes a to-be-stamped document and a stamping method; determining a first to-be-stamped area of the document when a format of the document is a predetermined document format and the stamping method is a first stamping method; and invoking an electronic signature stamp corresponding to the document by using an encryption algorithm interface, and placing the electronic signature stamp in the first to-be-stamped area to generate a first electronic signature stamp document.

The above is an example solution of a computing device in the embodiments. It is worthwhile to note that the technical solution of the computing device has the same concept as the technical solution of the previous method for electronically stamping a document. For details not described in the technical solution of the computing device, references can be made to descriptions of the technical solution of the previous method for electronically stamping a document.

One or more embodiments of the present specification further provide a computer-readable storage medium, where the computer-readable storage medium stores computer instructions, and when the instructions are executed by a processor, the steps in the method for electronically stamping a document are implemented.

The above is an example solution of the computer-readable storage medium in the embodiments. It is worthwhile to note that the technical solution of the storage medium has the same concept as the technical solution of the previous method for electronically stamping a document. For details not described in the technical solution of the storage medium, references can be made to descriptions of the technical solution of the previous method for electronically stamping a document.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily require a particular execution order to achieve the desired results. In some implementations, multi-tasking and parallel processing can be advantageous.

The computer instruction includes computer program code, and the computer program code can be source code, object code, an executable file, some intermediate forms, etc. The computer-readable medium can include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, etc. that can carry the computer program code. It is worthwhile to note that content included in the computer-readable medium can be appropriately increased or decreased based on a requirement of legislation and patent practice in a jurisdiction. For example, in some jurisdictions, according to legislation and patent practice, the computer-readable medium does not include an electrical carrier signal and a telecommunications signal.

It is worthwhile to note that to make the description brief, the previous method embodiments are expressed as a combination of a series of actions. However, a person skilled in the art should know that the embodiments of the present specification are not limited to the described action sequence because some steps can be performed in other sequences or performed simultaneously according to the embodiments of the present specification. In addition, a person skilled in the art should also know that all the embodiments described in the present specification are examples of embodiments, and the actions and modules mentioned are not necessarily mandatory to the embodiments of the present specification.

In the previous embodiments, the description of each embodiment has respective focuses. For a part not described in detail in an embodiment, references can be made to related descriptions in other embodiments.

The examples of embodiments of the present specification disclosed above are merely intended to help describe the present specification. The optional embodiments do not describe all details in detail, and the present disclosure is not limited to the specific implementations. Clearly, many modifications and changes can be made based on the content of the embodiments of the present specification. These embodiments are selected and described in detail in the present specification to better explain principles and practical applications of the embodiments of the present specification, so that a person skilled in the art can better understand and use the present specification. The present specification is limited only by the claims and all the scope and equivalents thereof.

What is claimed is:

1. A computer-implemented method, comprising:
   receiving an electronic stamping instruction, wherein the electronic stamping instruction comprises a to-be-stamped document and a stamping type;
   in response to determining that a format of the to-be-stamped document is a predetermined document format and the stamping type is a first stamping type, determining a first to-be-stamped area of the to-be-stamped document;
   identifying an electronic stamp corresponding to the to-be-stamped document using an encryption algorithm interface; and
   generating a first electronically stamped document comprising the electronic stamp in the first to-be-stamped area.

2. The computer-implemented method of claim 1, wherein determining the first to-be-stamped area of the to-be-stamped document comprises:
   segmenting the to-be-stamped document into a plurality of text areas based on a predetermined segmentation box;
   counting a number of characters recognized in each of the plurality of text areas; and
   determining the first to-be-stamped area of the to-be-stamped document as a text area with a smallest number of characters.

3. The computer-implemented method of claim 1, wherein determining the first to-be-stamped area of the to-be-stamped document comprises:
   segmenting a first page of the to-be-stamped document into a plurality of text areas based on a predetermined segmentation box;
   counting a number of characters recognized in each of the plurality of text areas;
   determining a stamping area of the first page of the to-be-stamped document as a text area with a smallest number of texts;
   determining stamping areas of other pages of the to-be-stamped document as a location in the other pages of the to-be-stamped document that corresponds to the stamping area of the first page; and
   determining the first to-be-stamped area of the to-be-stamped document as the stamping area of the first page and the stamping areas of the other pages.

4. The computer-implemented method of claim 1, wherein determining the first to-be-stamped area of the to-be-stamped document comprises:
   in response to determining that the to-be-stamped document comprise a text that matches a predetermined stamp text, determining the first to-be-stamped area of the to-be-stamped document as a location of the text that matches the predetermined stamp text.

5. The computer-implemented method of claim 1, further comprising:
   in response to determining that the format of the to-be-stamped document is the predetermined document format and the stamping type is a second stamping type, determining a second to-be-stamped area of the to-be-stamped document.

6. The computer-implemented method of claim 5, wherein determining the second to-be-stamped area of the to-be-stamped document comprises:
   horizontally splicing a current page of the to-be-stamped document and a next page of the to-be-stamped document; and
   determining the second to-be-stamped area of the to-be-stamped document as a splicing area of the current page and the next page of the to-be-stamped document.

7. The computer-implemented method of claim 5, wherein determining the second to-be-stamped area of the to-be-stamped document comprises:
   identifying the electronic stamp corresponding to the to-be-stamped document using the encryption algorithm interface;
   dividing the electronic stamp by half into a first electronic stamp and a second electronic stamp;
   determining a first edge stamping area as a first edge area that is in a current page of the to-be-stamped document and that has a same width as the first electronic stamp;
   determining a second edge stamping area as a second edge area that is in a next page of the to-be-stamped document and that has a same width as the second electronic stamp, wherein a first location of the first edge stamping area corresponds to a second location of the second edge stamping area; and
   determining the second to-be-stamped area of the to-be-stamped document as the first edge stamping area and the second edge stamping area.

8. The computer-implemented method of claim 7, further comprising:
   generating a second electronically stamped document comprising the first electronic stamp in the first edge stamping area and the second electronic stamp in the second edge stamping area.

9. A non-transitory, computer-readable medium storing one or more instructions executable by a computer system to perform operations comprising:
   receiving an electronic stamping instruction, wherein the electronic stamping instruction comprises a to-be-stamped document and a stamping type;
   in response to determining that a format of the to-be-stamped document is a predetermined document format and the stamping type is a first stamping type, determining a first to-be-stamped area of the to-be-stamped document;

identifying an electronic stamp corresponding to the to-be-stamped document using an encryption algorithm interface; and generating a first electronically stamped document comprising the electronic stamp in the first to-be-stamped area.

10. The non-transitory, computer-readable medium of claim 9, wherein determining the first to-be-stamped area of the to-be-stamped document comprises:

segmenting the to-be-stamped document into a plurality of text areas based on a predetermined segmentation box;

counting a number of characters recognized in each of the plurality of text areas; and determining the first to-be-stamped area of the to-be-stamped document as a text area with a smallest number of characters.

11. The non-transitory, computer-readable medium of claim 9, wherein determining the first to-be-stamped area of the to-be-stamped document comprises:

segmenting a first page of the to-be-stamped document into a plurality of text areas based on a predetermined segmentation box;

counting a number of characters recognized in each of the plurality of text areas;

determining a stamping area of the first page of the to-be-stamped document as a text area with a smallest number of texts;

determining stamping areas of other pages of the to-be-stamped document as a location in the other pages of the to-be-stamped document that corresponds to the stamping area of the first page; and determining the first to-be-stamped area of the to-be-stamped document as the stamping area of the first page and the stamping areas of the other pages.

12. The non-transitory, computer-readable medium of claim 9, wherein determining the first to-be-stamped area of the to-be-stamped document comprises:

in response to determining that the to-be-stamped document comprise a text that matches a predetermined stamp text, determining the first to-be-stamped area of the to-be-stamped document as a location of the text that matches the predetermined stamp text.

13. The non-transitory, computer-readable medium of claim 9, wherein the operations further comprise:

in response to determining that the format of the to-be-stamped document is the predetermined document format and the stamping type is a second stamping type, determining a second to-be-stamped area of the to-be-stamped document.

14. The non-transitory, computer-readable medium of claim 13, wherein determining the second to-be-stamped area of the to-be-stamped document comprises:

horizontally splicing a current page of the to-be-stamped document and a next page of the to-be-stamped document; and determining the second to-be-stamped area of the to-be-stamped document as a splicing area of the current page and the next page of the to-be-stamped document.

15. The non-transitory, computer-readable medium of claim 13, wherein determining the second to-be-stamped area of the to-be-stamped document comprises:

identifying the electronic stamp corresponding to the to-be-stamped document using the encryption algorithm interface;

dividing the electronic stamp by half into a first electronic stamp and a second electronic stamp;

determining a first edge stamping area as a first edge area that is in a current page of the to-be-stamped document and that has a same width as the first electronic stamp;

determining a second edge stamping area as a second edge area that is in a next page of the to-be-stamped document and that has a same width as the second electronic stamp, wherein a first location of the first edge stamping area corresponds to a second location of the second edge stamping area; and determining the second to-be-stamped area of the to-be-stamped document as the first edge stamping area and the second edge stamping area.

16. The non-transitory, computer-readable medium of claim 15, wherein the operations further comprise:

generating a second electronically stamped document comprising the first electronic stamp in the first edge stamping area and the second electronic stamp in the second edge stamping area.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving an electronic stamping instruction, wherein the electronic stamping instruction comprises a to-be-stamped document and a stamping type;

in response to determining that a format of the to-be-stamped document is a predetermined document format and the stamping type is a first stamping type, determining a first to-be-stamped area of the to-be-stamped document;

identifying an electronic stamp corresponding to the to-be-stamped document using an encryption algorithm interface; and generating a first electronically stamped document comprising the electronic stamp in the first to-be-stamped area.

18. The computer-implemented system of claim 17, wherein determining the first to-be-stamped area of the to-be-stamped document comprises:

segmenting the to-be-stamped document into a plurality of text areas based on a predetermined segmentation box;

counting a number of characters recognized in each of the plurality of text areas; and determining the first to-be-stamped area of the to-be-stamped document as a text area with a smallest number of characters.

19. The computer-implemented system of claim 17, wherein determining the first to-be-stamped area of the to-be-stamped document comprises:

segmenting a first page of the to-be-stamped document into a plurality of text areas based on a predetermined segmentation box;

counting a number of characters recognized in each of the plurality of text areas;

determining a stamping area of the first page of the to-be-stamped document as a text area with a smallest number of texts;

determining stamping areas of other pages of the to-be-stamped document as a location in the other pages of the to-be-stamped document that corresponds to the stamping area of the first page; and determining the first to-be-stamped area of the to-be-stamped document as the stamping area of the first page and the stamping areas of the other pages.

20. The computer-implemented system of claim 17, wherein determining the first to-be-stamped area of the to-be-stamped document comprises:
in response to determining that the to-be-stamped document comprise a text that matches a predetermined stamp text, determining the first to-be-stamped area of the to-be-stamped document as a location of the text that matches the predetermined stamp text.

* * * * *